(12) United States Patent
Bishop et al.

(10) Patent No.: US 6,852,141 B2
(45) Date of Patent: Feb. 8, 2005

(54) FILTER ELEMENT HAVING CENTER PIECE AND METHODS

(75) Inventors: Wayne R W Bishop, St. Louis Park, MN (US); William Michael Juliar, Coon Rapids, MN (US); Jian Xu, Maple Grove, MN (US); Steven Scott Gieseke, Richfield, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 89 days.

(21) Appl. No.: 10/157,257

(22) Filed: May 28, 2002

(65) Prior Publication Data

US 2002/0184864 A1 Dec. 12, 2002

Related U.S. Application Data

(60) Provisional application No. 60/296,269, filed on Jun. 6, 2001.

(51) Int. Cl.[7] .......................... B01D 29/07; B01D 46/24
(52) U.S. Cl. ......................... 55/385.3; 55/498; 55/502; 55/511; 55/521; 55/527; 55/DIG. 5
(58) Field of Search ............................... 55/385.3, 497, 55/498, 502, 504, 510, 511, 521, 527, DIG. 5; 96/125, 150, 154

(56) References Cited

U.S. PATENT DOCUMENTS

| | | | |
|---|---|---|---|
| 1,238,068 A | | 8/1917 | Slater et al. |
| 2,210,397 A | * | 8/1940 | Dreiss .................. 210/487 |
| 2,502,545 A | | 4/1950 | Wellborn |
| 2,559,604 A | | 6/1951 | Bauer et al. |
| 2,890,796 A | | 1/1959 | Blood |
| 3,025,963 A | | 3/1962 | Bauer |
| 3,076,554 A | | 2/1963 | Bub |
| 3,209,917 A | | 10/1965 | Yelinek |
| 4,065,341 A | | 12/1977 | Cub |
| 4,234,038 A | * | 11/1980 | Dravnieks ................. 96/118 |
| 4,767,531 A | | 8/1988 | Ishii et al. |
| 4,869,738 A | * | 9/1989 | Alcorn et al. ............... 422/177 |
| 4,925,561 A | | 5/1990 | Ishii et al. |
| 4,997,466 A | | 3/1991 | Hood |
| 5,055,275 A | * | 10/1991 | Kanniainen et al. ........ 422/180 |
| 5,110,561 A | * | 5/1992 | Hitachi et al. .............. 422/180 |
| 5,137,696 A | | 8/1992 | Hitahi et al. |
| 5,211,846 A | | 5/1993 | Kott et al. |
| 5,229,078 A | | 7/1993 | Haerle |
| 5,238,052 A | * | 8/1993 | Chagnot ...................... 165/8 |

(List continued on next page.)

FOREIGN PATENT DOCUMENTS

| | | |
|---|---|---|
| GB | 703 823 A | 1/1954 |
| JP | 1-171615 | 7/1989 |
| WO | WO 97/40908 | 11/1997 |
| WO | WO 97/40910 | 11/1997 |
| WO | WO 97/40917 | 11/1997 |
| WO | WO 97/41939 | 11/1997 |
| WO | WO 01/34270 | 5/2001 |

Primary Examiner—Robert H. Spitzer
(74) Attorney, Agent, or Firm—Merchant & Gould P.C.

(57) ABSTRACT

A core construction for use in a filter element includes a tubular member having a wall with opposite first and second ends. The first end is adaptable for engagement with structure, such as a frame utilized with a filter element. The second end is also engageable with external structure, such as a handle. Preferably, a filter element is constructed by rolling a media construction around the core construction. The media construction includes a corrugated sheet secured to a flat sheet rolled around the core construction into a coiled construction. The coiled construction has inlet flutes and outlet flutes. Methods for using and assembling filter elements preferably use core constructions as described herein.

20 Claims, 5 Drawing Sheets

U.S. PATENT DOCUMENTS

| | | | |
|---|---|---|---|
| 5,304,312 A | | 4/1994 | Forster et al. |
| 5,346,675 A | | 9/1994 | Usui et al. |
| 5,374,402 A | | 12/1994 | Hitachi et al. |
| 5,435,870 A | | 7/1995 | Takagaki et al. |
| 5,472,463 A | | 12/1995 | Herman et al. |
| 5,484,466 A | | 1/1996 | Brown et al. |
| 5,487,767 A | | 1/1996 | Brown |
| 5,505,769 A | * | 4/1996 | Dinnage et al. ............... 96/153 |
| 5,514,035 A | * | 5/1996 | Denniston ................... 454/121 |
| 5,543,007 A | | 8/1996 | Takagaki et al. |
| 5,547,480 A | | 8/1996 | Coulonvaux |
| 5,556,542 A | | 9/1996 | Berman et al. |
| 5,714,126 A | | 2/1998 | Frund |
| 5,772,883 A | | 6/1998 | Rothman et al. |
| D396,098 S | | 7/1998 | Gillingham et al. |
| 5,792,247 A | | 8/1998 | Gillingham et al. |
| 5,820,646 A | | 10/1998 | Gillingham et al. |
| 5,895,574 A | | 4/1999 | Friedmann et al. |
| 5,897,676 A | | 4/1999 | Engel et al. |
| 6,190,432 B1 | | 2/2001 | Gieseke et al. |
| 6,210,469 B1 | | 4/2001 | Tokar |
| 6,235,195 B1 | | 5/2001 | Tokar |
| 6,517,598 B2 | * | 2/2003 | Anderson et al. ............. 55/498 |
| 6,527,837 B2 | * | 3/2003 | Kurosawa et al. ............ 96/125 |
| 6,533,845 B2 | * | 3/2003 | Tokar et al. ................... 95/273 |
| 6,544,310 B2 | * | 4/2003 | Badeau et al. ............. 55/385.3 |
| 6,610,126 B2 | * | 8/2003 | Xu et al. ....................... 95/273 |
| 2002/0071979 A1 | * | 6/2002 | DuBose et al. ................ 429/26 |

* cited by examiner

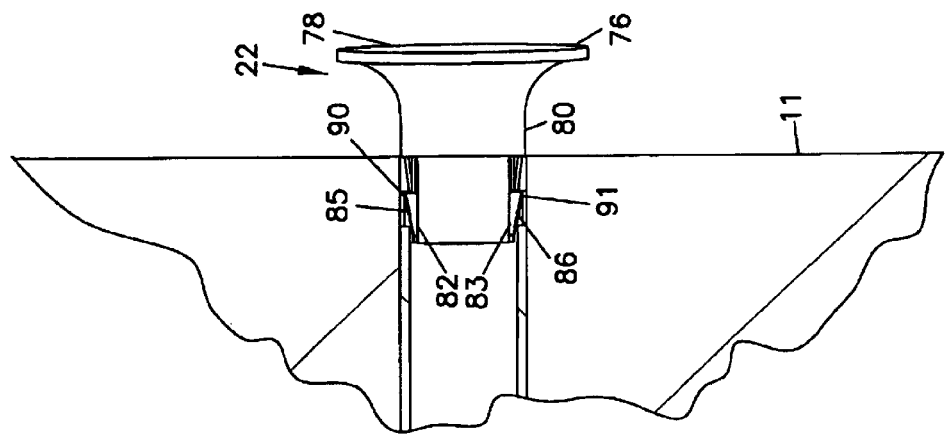
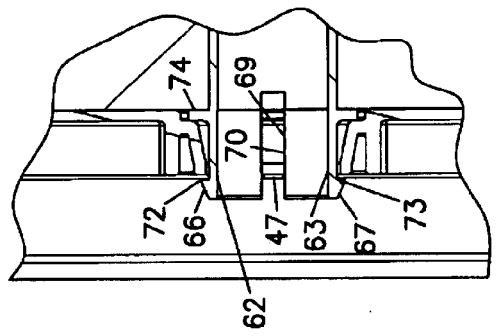
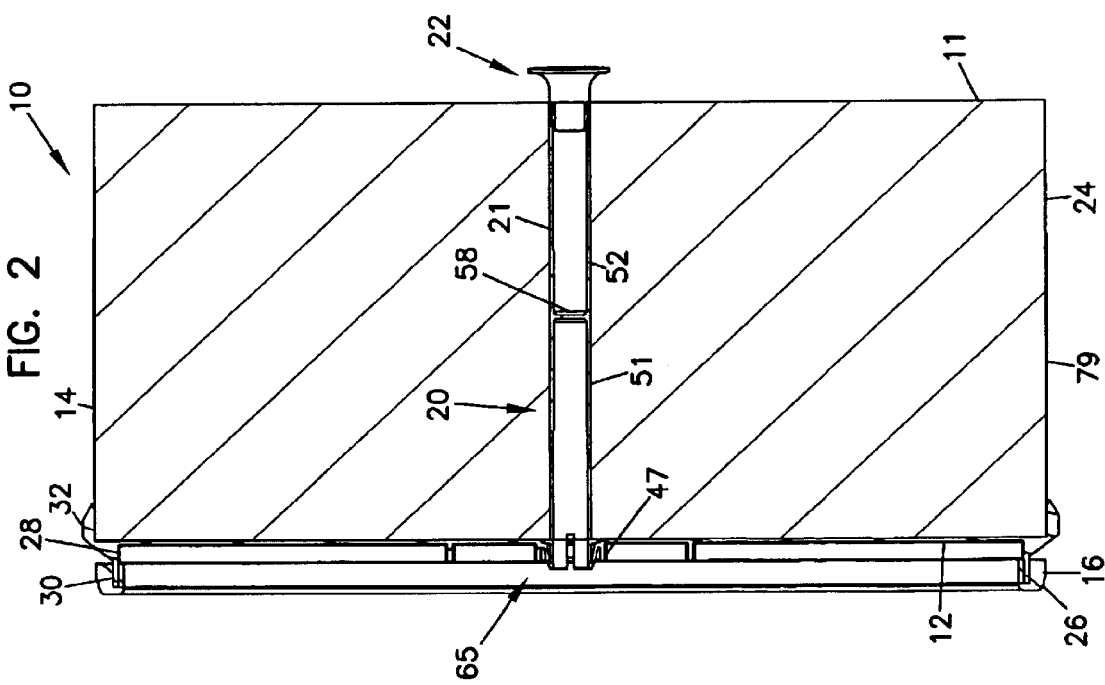

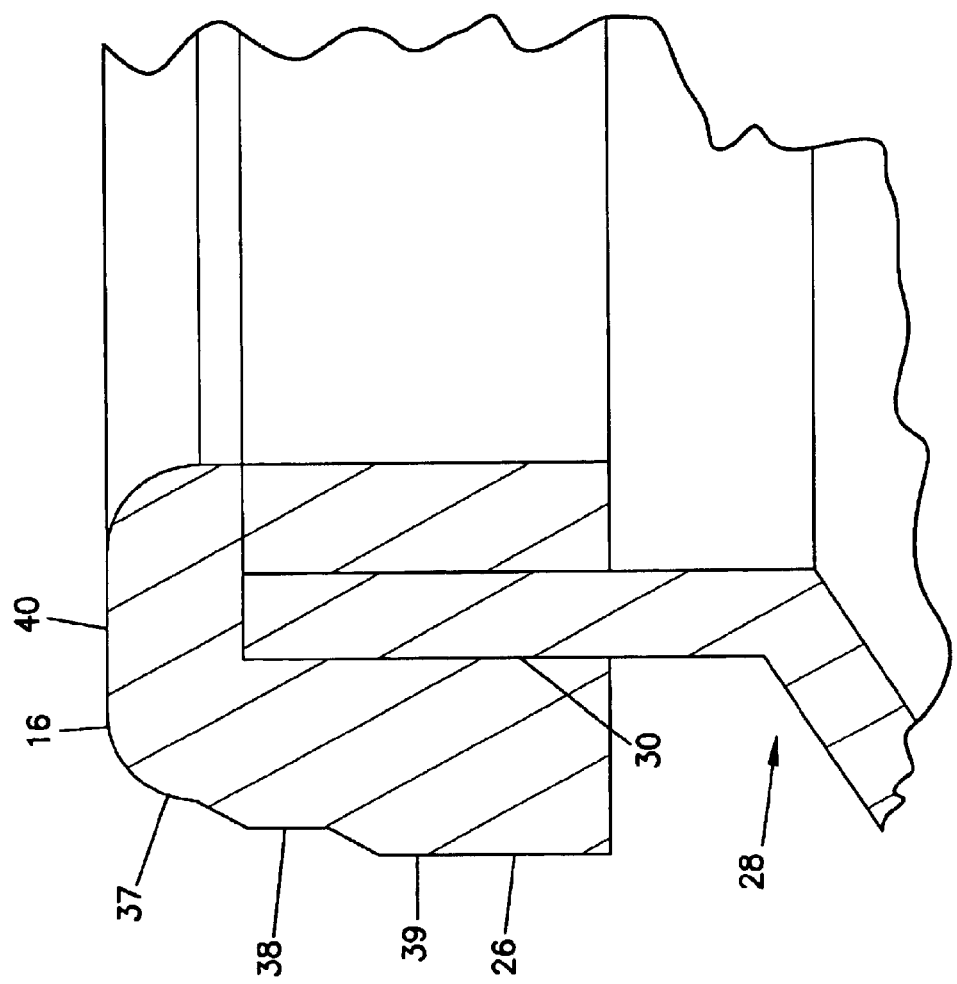

FILTER ELEMENT HAVING CENTER PIECE AND METHODS

This application claims priority under 35 U.S.C. § 119(e) to provisional application Ser. No. 60/296,269 filed Jun. 6, 2001; application Ser. No. 60/296,269 is incorporated herein by reference.

TECHNICAL FIELD

This disclosure describes filter constructions for filtering fluids, such as gas or liquid. In particular, this disclosure describes a filter element having a center piece and methods for using and assembling a filter element having a center piece.

BACKGROUND

Straight through flow filter elements have been used in systems for cleaning fluid passing therethrough. Straight through flow filter elements typically have an inlet face and an oppositely disposed outlet face. In this manner, fluid flows in one direction upon entering the filter element at the inlet face and will have the same direction of flow as it exits the outlet face. Typically, straight through flow filter elements will be installed in a duct or housing of some type. After a period of use, the filter element will require servicing, either cleaning or a complete replacement of the filter element. If it is difficult or inconvenient to service the filter element, the user may delay the proper servicing, which can cause damage to whatever system is being filtered.

Improvements to straight through flow filter elements are desirable.

SUMMARY

A core construction for use in a filter element includes a tubular member having a wall with opposite first and second ends. The first end is adaptable for engagement with structure, such as a frame utilized with a filter element. The second end is also engageable with external structure, such as a handle. Preferably, a filter element is constructed by rolling a media construction around the core construction. The media construction includes a corrugated sheet secured to a flat sheet rolled around the core construction into a coiled construction. The coiled construction has inlet flutes and outlet flutes.

Methods for using and assembling filter elements preferably use core constructions as described herein.

BRIEF DESCRIPTION OF THE DRAWINGS

FIG. 2 is a schematic, cross-sectional view of the filter element depicted in FIG. 1, but in FIG. 2, the filter element is assembled; the cross-section being taken along the line 2—2 of FIG. 1;

FIG. 4 is a schematic, enlarged, fragmented, cross-sectional view showing a connection between a frame and a core of the assembly depicted in FIG. 3;

FIG. 5 is a schematic, enlarged, fragmented, cross-sectional view depicting connection between a knob and a core of the assembly depicted in FIG. 3;

FIG. 6 is a schematic, enlarged, fragmented cross-sectional view of a seal member utilized herein.

DETAILED DESCRIPTION

Figure 1:
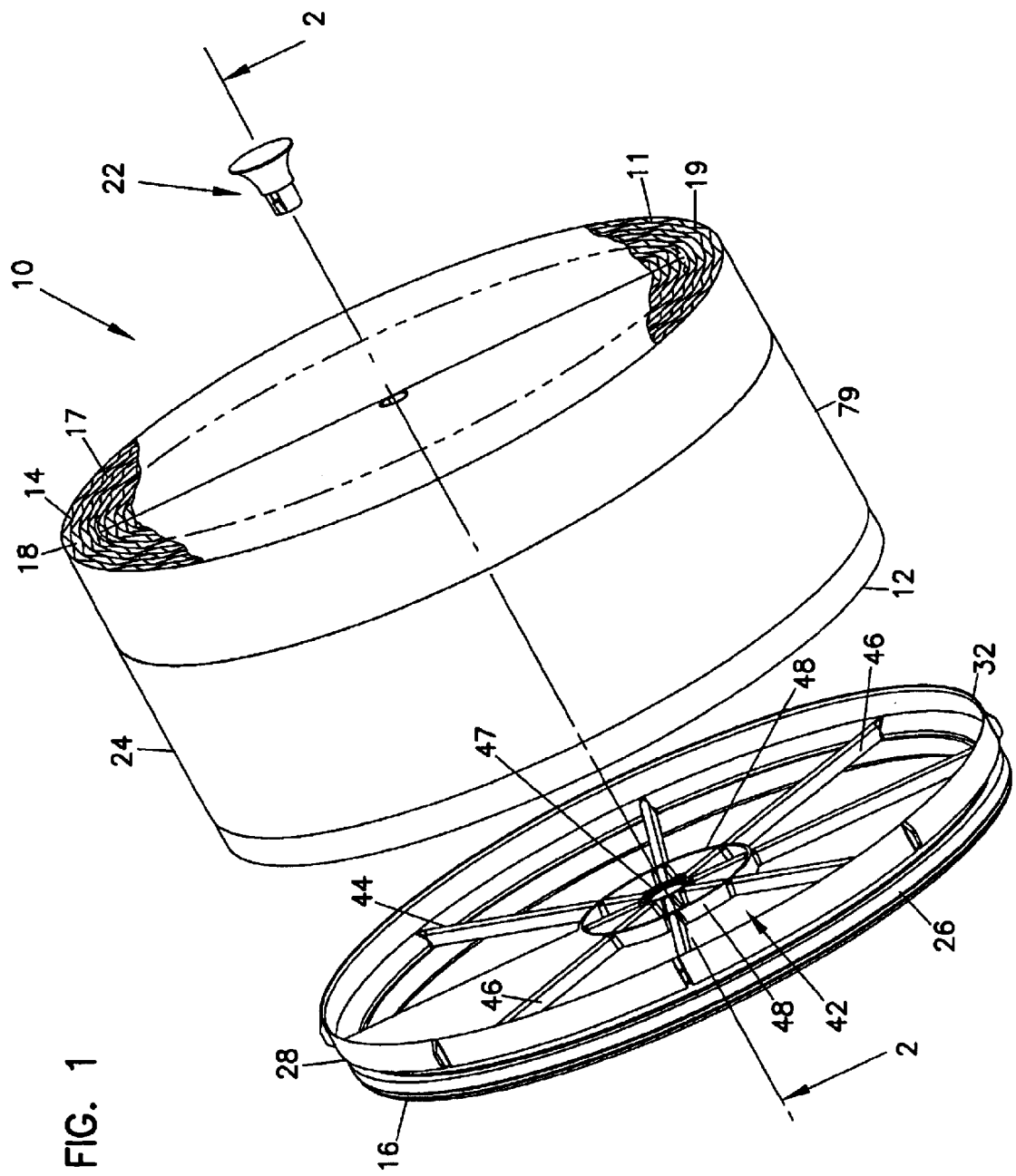
FIG. 1 is a schematic, exploded, perspective view of one embodiment of a filter element, constructed according to principles of this disclosure.

FIG. 1 depicts a filter element 10 that is usable for cleaning fluid, such as gas, in particular air. The filter element 10 is configured to permit straight through flow. By the term "straight through flow," it is meant that the fluid flows directly through the filter element 10, entering at an inlet face 11 and exiting in a same direction at an opposite, outlet face 12 without turning a corner. The filter element 10 includes filter media 14 that is configured to filter particulates from the gas stream entering at the inlet face 11, such that the gas stream exiting the outlet face 12 is at least partially clean (i.e., free of particulates). As can also be seen in FIG. 1, the filter element 10 includes a seal member 16, which aids in inhibiting leakage between the filter element 10 and a housing or duct in which the filter element 10 is installed. The filter element 10 also includes a center piece construction 20 (FIGS. 2 and 3) of which an optional handle 22 attached thereto is visible in FIG. 1.

The inlet face 11 in FIG. 1 is depicted schematically, showing only a partial view of the filter media 14. The actual inlet face 11 has its entire inlet face 11 (other than portions of a central core, explained below) filled with the filter media 14.

Filter media 14 usable in this construction is described in detail in U.S. Pat. No. 6,190,432 and international publication WO 97/40918, published Nov. 6, 1997. Each of these publications is incorporated by reference herein. In general, the filter media 14 is a coiled construction 24 having a fluted sheet 17 secured to a flat sheet 18. The fluted sheet 17 generally is a corrugated layer and is secured to the flat sheet 18 with an adhesive, which helps to form appropriate seals. The corrugation utilized in the filter media 14 can be many types of configurations. Of those possible, examples include corrugations resulting in straight flutes, where the flutes are parallel to each other; straight flutes having crushed ends or pinched ends; and tapered flutes, where alternating flutes gradually converge from a wide section to a narrow section with the next adjacent flute diverging from a narrow section to a wide section. The corrugated sheet 17 and flat sheet 18 secured together are rolled or coiled around a portion of the center piece construction 20, as can be seen in FIG. 2, with an adhesive to inhibit air leakage between the media 14 and the center piece construction 20. When using this type of fluted construction, the flute chambers form alternating peaks and troughs. The troughs and peaks divide the flutes into a first row and a second row. The flute chambers are then closed by a bead of sealant that fills a portion of the upstream end of the flute between the fluting sheet and the flat sheet. On the opposite end, another end bead closes the downstream end of alternating flutes. This results in filter media 14 having media comprising a plurality of flute chambers, with each of the flute chambers having a first end adjacent to the filter element inlet face 11, and a second end adjacent to the filter element outlet face 12. Selected ones of the flute chambers are open at the first end and closed at the second end ("inlet flutes"), while selected ones of the flute chambers are closed at the first end and open at the second end ("outlet flutes").

When using filter media 14 constructed in this manner, during use, unfiltered fluid, such as air, enters the flute chambers at the inlet face 11 through the open upstream ends 19. The unfiltered fluid is not permitted to pass through the downstream ends of those flute chambers that they entered into because those particular flute chambers are closed by a sealant bead. Thus, the fluid is forced to proceed through the fluting sheet 17 or the flat sheet 18. As the unfiltered fluid passes through the fluting sheet 17 or the flat sheet 18, the fluid is cleaned or filtered. The fluid then passes through the flute chambers that have their upstream ends closed and their downstream ends open.

The flutes utilized in the filter media 14 can be many types of configurations. Of those possible, examples include straight flutes, where the flutes are parallel to each other; straight flutes having crushed ends; and tapered flutes, where alternating flutes gradually converge from a wide section to a narrow section with the next adjacent flute diverging from a narrow section to a wide section.

In reference now to FIG. 2, it can be seen how the filter media 14 is wound or coiled around a portion 21 of the center piece construction 20. FIG. 2 also depicts the seal member 16, in cross-section. The seal member 16 is for creating a seal with the housing 23 (FIG. 7) that the filter element 10 is installed within. Such a seal will inhibit leakage of fluid between the filter element 10 and the housing, to ensure that the unfiltered fluid must pass through the filter media 14 for cleaning. The seal member 16 can include various types of sealing arrangements, such as axially directed seals, radially directed seals, or a combination of these. In the particular one depicted in FIG. 2, the seal member 16 is a radial seal member 26, configured to result in a radially directed seal 27 (FIG. 7) with the housing 23. In this particular embodiment, the radial seal member 26 is supported by a frame construction 28. The frame construction 28 includes an extension 30 that projects or extends axially from the outlet face 12. The frame construction 28 also includes a skirt or band 32 that is used to secure the filter media 14 to remaining portions of the frame construction 28.

The radial seal member 26 and the manner in which it is used to seal against a housing is described in detail in U.S. Pat. No. 6,190,432, which is incorporated herein by reference. The particular radial seal member 26 that is preferred is shown, enlarged, in FIG. 6. The preferred seal member 26 depicted has a stepped cross-sectional configuration of increasing outermost dimensions from an end tip 40 and in the direction toward the rest of the filter element 10 and defines a plurality of progressively larger steps, in this case, three steps 37, 38, 39. The smallest step 37 allows for easy insertion of the filter element 10 into the housing 23. The largest step 39 ensures that a tight radial seal is formed. In preferred cases, the radial seal member 26 is made from a polyurethane foam material having "as-molded" density of no more than 25 lbs per cubic foot, typically about 11–22 lbs. per cubic foot. This material permits the seal member 26 to be soft and compressible, such that the seal member 26 can be compressed between the extension 30 and a sealing surface 29 of the housing 23 in which it is installed. In preferred applications, the seal member 26 is compressed between about 15% and 40% of its thickness.

Preferably, the radial seal member 26 will be supported by the frame construction 28 to help keep the seal member 26 properly oriented against the sealing surface 29 of the housing 23. The frame construction 28 preferably includes a truss system 42 (FIG. 1) to help support the seal member 26. In general, the truss system 42 includes a plurality of struts or support members 44 arranged and configured to provide structural support and take the forces exerted by the compression of the seal member 26 against the extension 30. The struts or support members 44 can be arranged in a variety of configurations. In the particular arrangement shown in FIG. 1, the truss system 42 includes a plurality of spokes 46 symmetrically arranged over the outlet face 12, radially extending from a hub 47 centered over the center piece construction 20 and terminating at the extension 30 and the band 32. The truss system 42 further includes arched members 48 extending between and connecting each of the spokes 46.

As mentioned above, the filter element 10 includes center piece construction 20. The center piece construction 20 provides a mounting structure for holding and having the filter media 14 mounted thereon. Preferably, the center piece construction 20 also provides structure that is constructed and arranged to connect or be secured to other portions in a fluid cleaning system. For example, the center piece construction 20 may be constructed to permit framework from the filter housing to be secured thereto. It may also provide structure to permit other structural support members from the filter element 10, the housing 23, or other portions of the filtration system. Alternatively, the center piece construction 20 may merely function to hold the filter media 14 and be devoid of any other connections. In situations where the center piece construction 20 is devoid of connections, either at one or both ends, the center piece construction 20 may be blocked with a suitable plug at one or both ends.

In the particular embodiment illustrated, the center piece construction 20 is constructed and arranged to be releasably, selectively secured or attached to the frame construction 28. In this particular embodiment, the center piece construction 20 is also depicted as being secured to optional handle 22.

Figure 3:
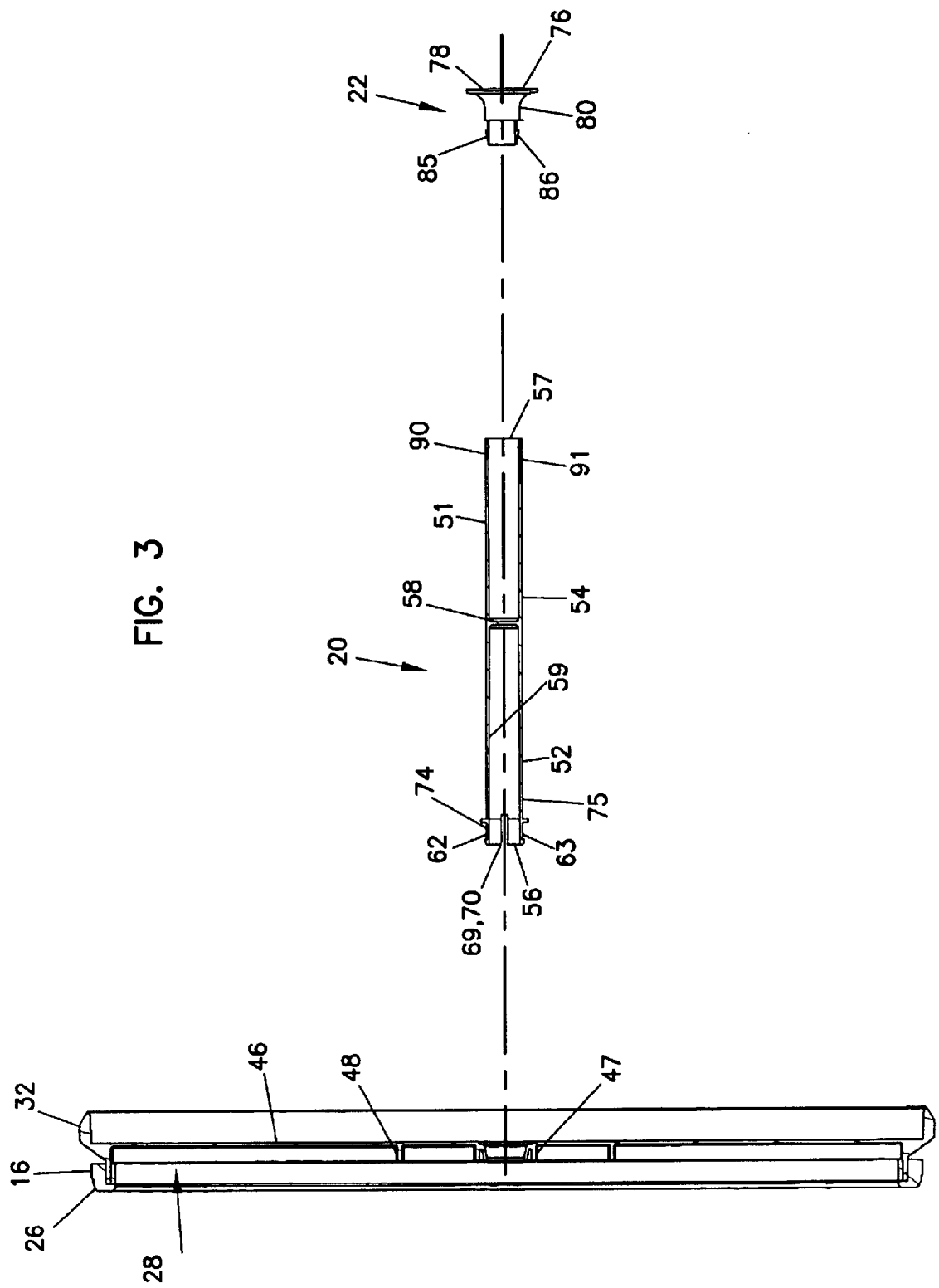
FIG. 3 is a schematic, exploded, cross-sectional view of an assembly utilized in the filter element of FIGS. 1 and 2.

FIG. 3 shows the center piece construction 20 in schematic, cross-sectional view. In this particular embodiment, the center piece construction 20 comprises a central core 51 to the filter element 10. The core 51 is embodied as tube 52, preferably, a hollow cylinder 54 with a wall 58 plugging the cylinder 54. The cylinder 54 includes the first and second opposite ends 56, 57. The first end 56 is configured for selective attachment to the frame construction 28, usually located at the outlet face 12. The second end 57 is configured for optional attachment to the handle 22, and is usually located at the inlet face 11. Wall 58 is shown at approximately the center of the cylinder 54 to close the interior 59. The wall 58 provides structural support to the cylinder 54 at this section.

As mentioned above, the first end 56 of the cylinder 54, in the one depicted, is constructed and arranged to connect to the frame construction 28. In reference now to FIG. 4, it can be seen that the first end 56 includes a hook construction 65. In particular, the hook construction 65 includes at least one flange, preferably, a pair of deflectable flanges 62, 63 having hooks 66, 67 at free ends thereof that engage the central hub 47 of the frame construction 28. In particular, the cylinder 54 has a pair of cut out extensions 69, 70 that allow the flanges 62, 63 to deflect toward each other (radially inwardly). Typically, the deflection will occur by camming force exerted by the hub 47 against the hooks 66, 67. As the frame construction 28 and the cylinder 54 are moved axially toward each other and the flanges 62, 63 are deflecting inwardly, eventually the hub 47 will reach the reliefs 72, 73 on the hooks 66, 67. When this happens, the flanges 62, 63 will deflect back in a direction toward their unstressed position, and the cylinder 54 will be secured to the frame construction 28 because the hub 47 will be trapped below the hooks 66, 67. A rib 74, radially extending from the cylinder wall 75 and adjacent to the flanges 62, 63, prevents the frame 28 from sliding axially along the cylinder 75 toward the second end 57. It should be understood that the hook construction 65 could be on the framework 28 and engage the cylinder 54.

In reference now to FIG. 5, the second end 57 is shown optionally secured to the handle 22. In this particular embodiment, the handle 22 is in the form of a grip or knob 76. The knob 76 is arranged such that when mounted on the filter element 10, it includes a grasping structure 78. In one form, the grasping structure 78 is spaced a sufficient distance away from the inlet face 11 to permit at least a portion of a user's hand or fingers to be between the grasping structure 78 and the inlet face 11. In one example, the grasping structure 78 is spaced at least 0.5 inch from the inlet face 11. The particular knob 76 depicted includes a shaft 80 adjacent to the grasping structure 78. The grasping structure 78 depicted has the shape of a truncated hemisphere. The shaft 80 is constructed and arranged to allow convenient engagement with the cylinder 54. In particular, the shaft 80 includes a pair of deflecting flanges 82, 83 having hooks 85, 86. Adjacent to each of the flanges 82, 83 are cut out extensions (not shown) that permit the flanges 82, 83 to deflect radially inwardly and toward each other.

The preferred cylinder 54, at the second end 57, defines at least one, and preferably, a pair of apertures or voids 90, 91. The voids 90, 91 receive the deflecting flanges 82, 83 and engage the hooks 85, 86 to provide for a snap-fit engagement between the knob 76 and the cylinder 54. Again, it should be understood that parts can be reversed—that is, the second end 57 could have the barbs or deflecting flanges and engage apertures on the handle 22.

Attention is again directed to FIG. 3. Note that in the cylinder 54 depicted, the voids 90, 91 are radially offset by 90 degrees relative to the cut out extensions 69, 70 of the first end 56. The voids 90, 91 are generally in line with the flanges 62, 63. This is arranged in this manner for molding techniques.

In general, to assemble the filter element 10, the filter media 14 is coiled or wound around the core 51. After the filter media 14 is in place around the core 51, the frame construction 28 holding the radial seal member 26 is mounted onto the filter media 14. This is done by snap engagement between the deflecting flanges 62, 63 and the hub 47. The band 32 is also secured to the outer annular surface 79 of the coiled construction 24 with, for example, adhesive. The knob 76 is snapped into the second end 57 of the core 51, by engagement between the flanges 82, 83 and the voids 90, 91. Of course, it should be realized that the knob 76 may be secured to the coiled construction 54 before the frame construction 28 is secured to the coiled construction 54.

Figure 7:
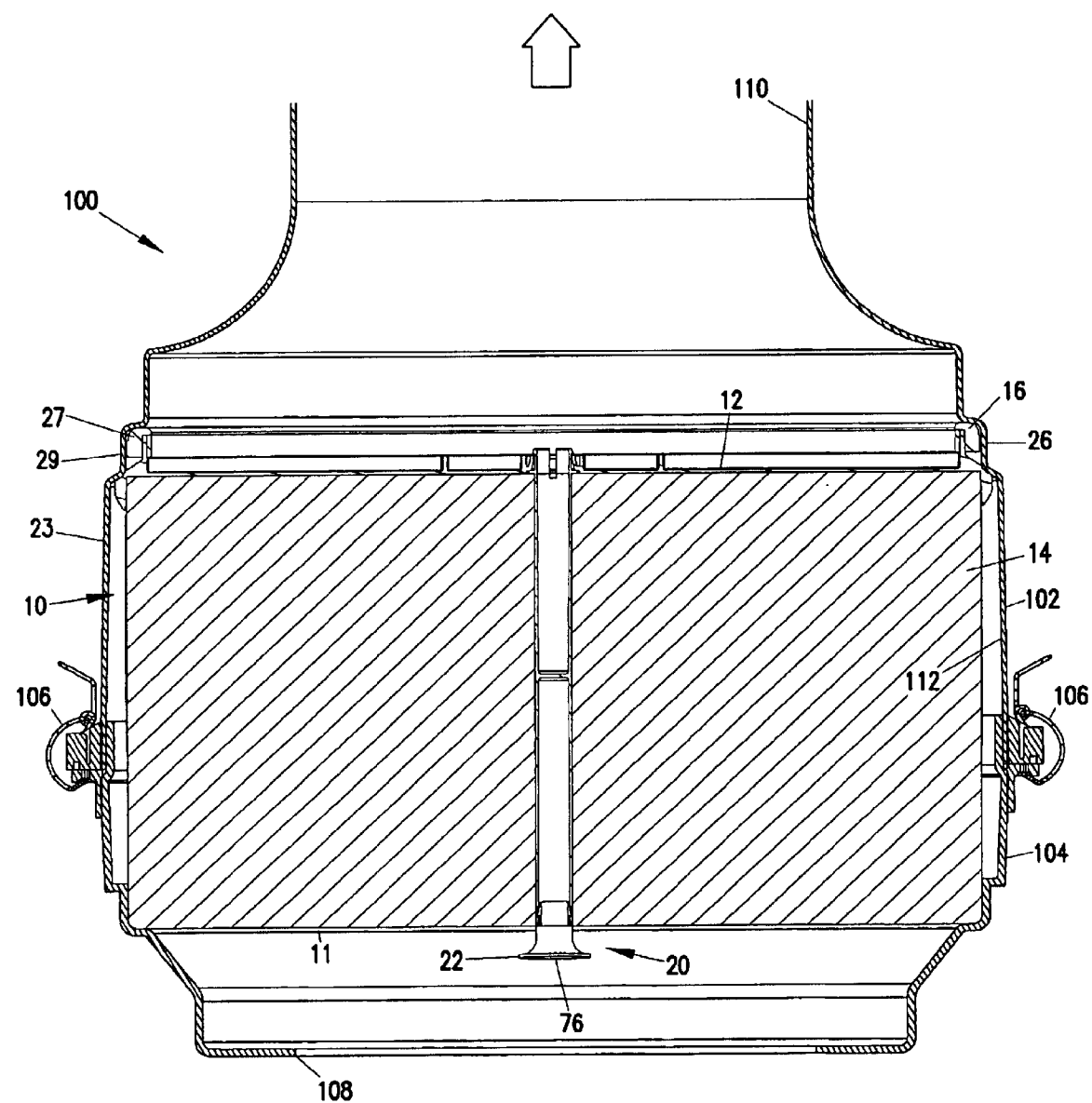
FIG. 7 is a schematic, cross-sectional view of the filter element of FIG. 2 operatively installed in an air cleaner housing.

FIG. 7 illustrates an air cleaner 100. The air cleaner includes housing 23 with the filter element operably installed therein. In the particular one shown in FIG. 7, the housing 23 includes a body member 102 and a removable cover 104. The cover 104 is selectively removable from the body member 102 by way of latches 106. The housing 23 defines an inlet port 108 and an outlet port 110. FIG. 7 illustrates the filter element 10 operably installed within the interior 112 of the housing 23. By "operably installed", it is meant that the filter element 10 is in place in the housing 23 with the seal 27 formed such that normal filtering operation can occur. Normal filtering operation includes fluid passing through the inlet port 108, through the inlet face 11, through the filter media 14, out through the outlet face 12, and out through the outlet port 110. Fluid is not allowed to bypass the filter media 14 due to the existence of the seal 27.

To service the air cleaner 100, the cover 104 is removed from the body member 102 by releasing the latches 106. The knob 76 is then grasped, and the seal 27 is released by pulling the filter element 10 away from the sealing surface 29. The filter element 10 is pulled from the body member 102 and out of the interior 112. The filter element 10 is then discarded and replaced with a new filter element 10. The new filter element 10 is inserted through an opening in the body member 102 and pushed against the sealing surface 29 until the radial seal member 26 forms the radial seal 27 with the housing 23. The cover 104 is then placed over the exposed end of the filter element 10. The cover 104 is then secured to the body member 102 by securing the latches 106.

What is claimed is:

1. A filter element comprising:
    (a) a core construction comprising a tube having a wall with opposite first and second ends;
        (i) said core construction first end including a hook construction;
            (A) said hook construction including at least a first hook;
        (ii) said core construction second end defining at least one void in said wall; and
    (b) a media construction comprising a corrugated sheet secured to a flat sheet rolled around said core construction into a coiled construction; the coiled construction having a plurality of flutes, a first end, and an opposite second end;
        (i) said plurality of flutes comprising inlet flutes and outlet flutes;
            (A) said inlet flutes being open at portions adjacent to said first end and closed at portions adjacent to said second end; and said outlet flutes being closed at portions adjacent to said first end and open at portions adjacent to said second end.

2. A filter element according to claim 1 wherein:
    (a) said hook construction includes first and second flanges; first and second cut out extensions; and a projecting rib;
        (i) said first and second cut out extensions being adjacent to said first and second flanges to permit said first and second flanges to deflect radially toward each other;
        (ii) each of said first and second flanges including a hook at a free end thereof;
        (iii) said projecting rib extending radially from said wall; said rib being oriented between said first and second flanges and said second end of said wall; and
    (b) said core construction second end defining a pair of voids in said wall;
        (i) said pair of voids being aligned with said first and second flanges.

3. A filter element according to claim 2 further including:
    (a) a frame having a central hub; said frame being secured to said coiled construction;
        (i) said core construction being secured to said frame; and
        (ii) said hooks on said first and second flanges engaging said central hub.

4. A filter element according to claim 3 further including:
    (a) a seal member oriented adjacent to said second end of said coiled construction and being supported by said frame.

5. A filter element according to claim 4 wherein:
    (a) said frame has a skirt and an axial extension;
        (i) said skirt circumscribing and securing said frame to said coiled construction;
        (ii) said axial extension having an annular portion;
            (A) said annular portion of said axial extension supporting said seal member.

6. A filter element according to claim 2 further including:
    (a) a knob secured to said coiled construction for manipulation of the filter element.

7. A filter element according to claim 6 wherein:
(a) said knob has a grasping portion and a shaft;
   (i) said shaft including a pair of deflectable extensions each having a barb;
   (ii) said knob being snap-fit to said second end of said core construction by engagement between each of the barbs and said pair of voids in said wall.
8. A filter element according to claim 1 wherein:
(a) said core construction tube comprises a cylinder.
9. A filter element comprising:
(a) a core construction comprising a tube having a wall with opposite first and second ends;
   (i) said first end including a hook construction and a projecting rib extending radially from said wall; and
   (ii) said second end including at least one structure-receiving void;
(b) a media construction comprising a corrugated sheet secured to a flat sheet rolled around said core construction into a coiled construction; the coiled construction having a plurality of flutes, a first end, and an opposite second end;
   (i) said plurality of flutes comprising inlet flutes and outlet flutes;
      (A) said inlet flutes being open at portions adjacent to said first end and closed at portions adjacent to said second end; and said outlet flutes being closed at portions adjacent to said first end and open at portions adjacent to said second end;
(c) a frame and a seal member; said frame securing said seal member to said coiled construction; said frame having a skirt, an axial extension, and a central hub;
   (i) said skirt circumscribing and securing said frame to said coiled construction;
   (ii) said axial extension projecting axially from said second end of said coiled construction; said axial extension having an annular portion;
      (A) said annular portion of said axial extension supporting said first member to orient said first member in a radial direction; and
   (iii) said hook construction engaging said central hub to secure said frame to said core construction;
      (A) said central hub being trapped between said hook construction and said projecting rib;
(d) a handle secured to said core construction by snap engagement between said handle and said at least one void.
10. A filter element according to claim 9 wherein:
(a) said hook construction includes first and second flanges and first and second cut out extensions;
   (i) each of said first and second flanges including a hook at a free end thereof; and
   (ii) said first and second cut out extensions being adjacent to said first and second flanges to permit said first and second flanges to deflect radially toward each other.
11. A filter element according to claim 9 wherein:
(a) said tube comprises a cylinder.
12. An air cleaner comprising:
(a) a housing defining an interior; and
(b) a filter element operatively and removably mounted within the filter interior; the filter element including:
   (i) a core construction comprising a tube having a wall with opposite first and second ends; said core construction first end including a hook construction; said hook construction including at least a first hook; said core construction second end defining at least one void in said wall; and
   (ii) a media construction comprising a corrugated sheet secured to a flat sheet rolled around said core construction into a coiled construction; the coiled construction having a plurality of flutes, a first end, and an opposite second end; said plurality of flutes comprising inlet flutes and outlet flutes;
      (A) said inlet flutes being open at portions adjacent to said first end and closed at portions adjacent to said second end; and said outlet flutes being closed at portions adjacent to said first end and open at portions adjacent to said second end.
13. An air cleaner according to claim 12 wherein:
(a) said filter element includes a seal member oriented adjacent to said second end of said coiled construction; said seal member forming a seal with said housing.
14. A method of assembling a filter element; the method comprising:
(a) providing a filter core having a first end and an opposite second end;
(b) providing a media construction comprising a corrugated sheet secured to a flat sheet;
(c) rolling the media construction around the filter core to form a coiled construction; the coiled construction having a plurality of flutes, a first end, an opposite second end, and an outer annular surface;
   (i) the plurality of flutes comprising inlet flutes and outlet flutes;
      (A) the inlet flutes being open at portions adjacent to the first end and closed at portions adjacent to the second end; and the outlet flutes being closed at portions adjacent to the first end and open at portions adjacent to the second end; and
(d) securing at least one of:
   (i) the coiled construction to a frame by snapping the first end of the filter core to a frame; and
   (ii) a handle to the coiled construction by snapping a handle to the second end of the filter core.
15. A method according to claim 14 wherein:
(a) securing includes securing both the coiled construction to a frame by snapping the first end of the filter core to a frame; and securing a handle to the coiled construction by snapping a handle to the second end of the filter core.
16. A method according to claim 15 wherein:
(a) securing a handle is completed before securing the coiled construction.
17. A method according to claim 16 further including:
(a) securing a seal member to the coiled construction.
18. A method according to claim 17 wherein:
(a) securing a seal member to the coiled construction includes securing the coiled construction to a frame supporting the seal member.
19. A method according to claim 18 wherein:
(a) securing the coiled construction to a frame includes engaging a pair of hooked flanges with a central hub of the frame.
20. A method according to claim 15 wherein:
(a) securing a handle to the coiled construction includes snapping a handle having a pair of extending barbs into a pair of voids in the second end of the filter core.

* * * * *